United States Patent
Yajima et al.

(10) Patent No.: US 9,456,394 B2
(45) Date of Patent: Sep. 27, 2016

(54) RADIO COMMUNICATION SYSTEM, RADIO BASE STATION AND COMMUNICATION METHOD

(71) Applicant: NTT DOCOMO, INC., Tokyo (JP)

(72) Inventors: Tatsuro Yajima, Tokyo (JP); Yoshitsugu Shimazu, Tokyo (JP); Takayuki Watanabe, Tokyo (JP); Hideaki Takahashi, Tokyo (JP); Kohei Kiyoshima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/404,708

(22) PCT Filed: May 29, 2013

(86) PCT No.: PCT/JP2013/064866
§ 371 (c)(1),
(2) Date: Dec. 1, 2014

(87) PCT Pub. No.: WO2013/180159
PCT Pub. Date: Dec. 5, 2013

(65) Prior Publication Data
US 2015/0126191 A1 May 7, 2015

(30) Foreign Application Priority Data

Jun. 1, 2012 (JP) .................................. 2012-126138

(51) Int. Cl.
*H04W 36/08* (2009.01)
*H04W 36/00* (2009.01)
*H04W 92/20* (2009.01)

(52) U.S. Cl.
CPC ......... *H04W 36/08* (2013.01); *H04W 36/0055* (2013.01); *H04W 92/20* (2013.01)

(58) Field of Classification Search
CPC ........... H04W 36/08; H04W 36/0055; H04W 72/0426; H04W 76/02; H04W 76/025; H04W 36/0022; H04W 76/045; H04W 76/06; H04W 36/0016; H04W 84/005; H04W 28/0226; H04W 28/08; H04W 48/20; H04W 60/00

USPC .......................................................... 455/436
See application file for complete search history.

(56) References Cited

U.S. PATENT DOCUMENTS

2010/0202410 A1* 8/2010 Watanabe et al. ............ 370/331
2011/0176450 A1 7/2011 Kubota
(Continued)

FOREIGN PATENT DOCUMENTS

| JP | 2013/197895 A | 9/2013 |
| JP | 2015/520564 A | 7/2015 |

(Continued)

OTHER PUBLICATIONS

International Search Report for corresponding International Application No. PCT/JP2013/064866, mailed Aug. 13, 2013 (1 page).
3GPP TS 36.300 V10.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10);" Mar. 2011 (197 pages).
(Continued)

*Primary Examiner* — Kwasi Karikari
(74) *Attorney, Agent, or Firm* — Osha Liang LLP

(57) ABSTRACT

Provided are a radio communication system, a radio base station and a communication method which enable an inter base-station handover while reducing a processing load on a core network. An eNB 100 sends a handover request which requests an inter base-station handover of a UE 50 from the eNB 100 to an eNB 200 via an inter base-station transmission path. The eNB 200 receives the handover request from the eNB 100, and completes the handover of the UE 50 from the eNB 100 to the eNB 200 by using a communication path to the UE 50 via a highway between an MME 20 and the eNB 100 and the inter base-station transmission path.

5 Claims, 6 Drawing Sheets

(56) References Cited

U.S. PATENT DOCUMENTS

2013/0128873 A1\* 5/2013 Eipe et al. .................. 370/338
2013/0244659 A1 9/2013 Murasawa

FOREIGN PATENT DOCUMENTS

| WO | 2010/038590 A1 | 4/2010 |
| WO | 2013/170209 A1 | 11/2013 |

OTHER PUBLICATIONS

Written Opinion for corresponding International Application No. PCT/JP2013/064866, mailed Aug. 13, 2013 (3 pages).

Office Action issued in corresponding Japanese Application No. 2012-126138 dated Mar. 23, 2016, and English translation thereof (6 pages).

\* cited by examiner

PRIOR ART
FIG. 2
(a)
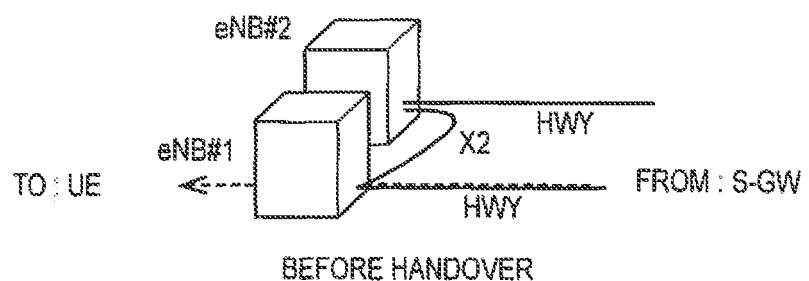
BEFORE HANDOVER
(b)
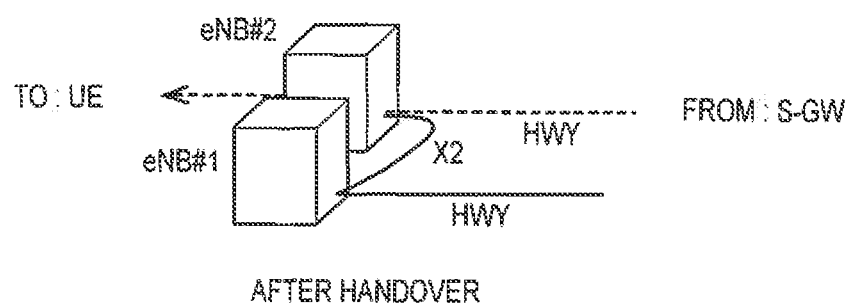
AFTER HANDOVER

AFTER HANDOVER

RADIO COMMUNICATION SYSTEM, RADIO BASE STATION AND COMMUNICATION METHOD

TECHNICAL FIELD

The present invention relates to a radio communication system including a first radio base station connected to a higher-level station via a first transmission path and a second radio base station connected to the higher-level station via a second transmission path and also connected to the first radio base station via an inter base-station transmission path, and relates to a radio base station and a communication method.

BACKGROUND ART

In accordance with Long Term Evolution (LTE) specified in the 3rd Generation Partnership Project (3GPP), an inter base-station handover (X2-HO) is specified (for example, Non-Patent Document 1) such that when a mobile station (UE) performs a handover from a radio base station (eNB) #1 to an eNB#2, data addressed to the UE and transmitted to the eNB#1 from a core network (specifically, a Serving Gateway (S-GW)) shall be relayed from the eNB#1 to the eNB#2 by using an inter base-station transmission path (X2) provided between the eNBs.

FIG. 1 illustrates a communication sequence of such a conventional inter base-station handover. In addition, FIGS. 2(a) and 2(b) illustrate data transfer routes to a UE before and after an inter base-station handover.

As illustrated in FIG. 1, the eNB#1 transmits X2-AP: HANDOVER REQUEST to the eNB#2 based on a measurement result (RRC: MEASUREMENT REPORT) of a radio environment received from the UE (S10), and then a handover to the eNB#2 is executed (S20 to S60). After completion of such an inter base-station handover, data addressed to the UE is transmitted to the UE via an S-GW, the eNB#1 and the eNB#2.

Thereafter, the eNB#2 sends a Mobility Management Entity (MME) S1-AP: PATH SWITCH REQUEST which requests to switch from a trunk transmission path (S1) between the eNB#1 and the S-GW (S70). The MME having received S1-AP: PATH SWITCH REQUEST sends S1-AP: PATH SWITCH REQUEST ACKNOWLEDGE to the eNB#2 (S80), and performs control such that a highway (HWY) to which data addressed to the UE is to be transferred, that is, the transmission path between the eNB and the S-GW can be switched from the path to the eNB#1 to the path to the eNB#2. As a result, as illustrated in FIG. 2(b), data is transferred to the UE via the HWY connected to the eNB#2.

PRIOR ART DOCUMENT

Non-Patent Document

Non-Patent Document 1: 3GPP TS 36.300 V 10.3.0 Subclause 20.2 Control Plane, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), March, 2011.

SUMMARY OF THE INVENTION

The aforementioned conventional inter base-station handover (X2-HO) has the following problems, however. Specifically, the inter base-station transmission path (X2) is basically used only during the execution of the handover as described above. System specifications are not made in view of an operation in which the X2 is continuously used to transfer data over a long time.

In addition, in X2-HO, S1-AP: PATH SWITCH REQUEST and S1-AP: PATH SWITCH REQUEST ACKNOWLEDGE are inevitably exchanged between the eNB and the MME, and accordingly the control for switching the highway between the eNB and the S-GW is complicated. This poses a problem in that the core network including the MME is burdened with a large processing load. In particular, with the current and future progress of the shift from 3G (W-CDMA) to LTE, the number of eNBs (LTE cells) under the MME is expected to increase so sharply that an increase in the processing load of the core network may become a serious problem.

Hence, the present invention has been made in view of the foregoing situations, and has an objective to provide a radio communication system, a radio base station and a communication method which enable an inter base-station handover while reducing a processing load on a core network.

A first feature of the present invention is a radio communication system including: a first radio base station connected to a higher-level station via a first transmission path; and a second radio base station connected to the higher-level station via a second transmission path and connected to the first radio base station via an inter base-station transmission path. The first radio base station includes a handover request unit configured to transmit a handover request which requests an inter base-station handover of a mobile station from the first radio base station to the second radio base station via the inter base-station transmission path, and the second radio base station includes a handover request reception unit configured to receive the handover request from the first radio base station, and a handover execution unit configured to, when the handover request reception unit receives the handover request, complete the handover of the mobile station from the first radio base station to the second radio base station by using a communication path to the mobile station via the first transmission path and the inter base-station transmission path.

A second feature of the present invention is a radio base station connected to a higher-level station via a trunk transmission path and connected to a different radio base station via an inter base-station transmission path, the radio base station including: a handover request reception unit configured to receive a handover request from the different radio base station; and a handover execution unit configured to, when the handover request reception unit receives the handover request, complete a handover of a mobile station from the different radio base station to the radio base station by using a communication path to the mobile station via a trunk transmission path between the higher-level station and the different radio base station and the inter base-station transmission path.

A third feature of the present invention is a communication method using a first radio base station connected to a higher-level station via a first transmission path, and a second radio base station connected to the higher-level station via a second transmission path and connected to the first radio base station via an inter base-station transmission path, the method comprising the steps of: sending, from the first radio base station, a handover request which requests an inter base-station handover of a mobile station from the first radio base station to the second radio base station via the inter base-station transmission path; receiving, at the second radio base station, the handover request from the first radio base station; and completing, by the second radio base station, the handover of the mobile station from the first radio base station to the second radio base station by using a communication path to the mobile station via the first transmission path and the inter base-station transmission path.

BRIEF DESCRIPTION OF THE DRAWINGS

FIG. 2 presents diagrams illustrating data transfer routes to a UE before and after a conventional inter base-station handover.

MODES FOR CARRYING OUT THE INVENTION

Next, embodiments of the present invention will be described. Note that, in the following description of the drawings, same or similar reference signs denote same or similar elements and portions. In addition, it should be noted that the drawings are schematic ones and dimensional ratios and the like are different from actual ones.

Accordingly, specific dimensions and the like should be determined in consideration of the following description. Moreover, the drawings also include portions having different dimensional relationships and ratios from each other.

(1) Overall Schematic Configuration of Mobile Communication System

Figure 1:
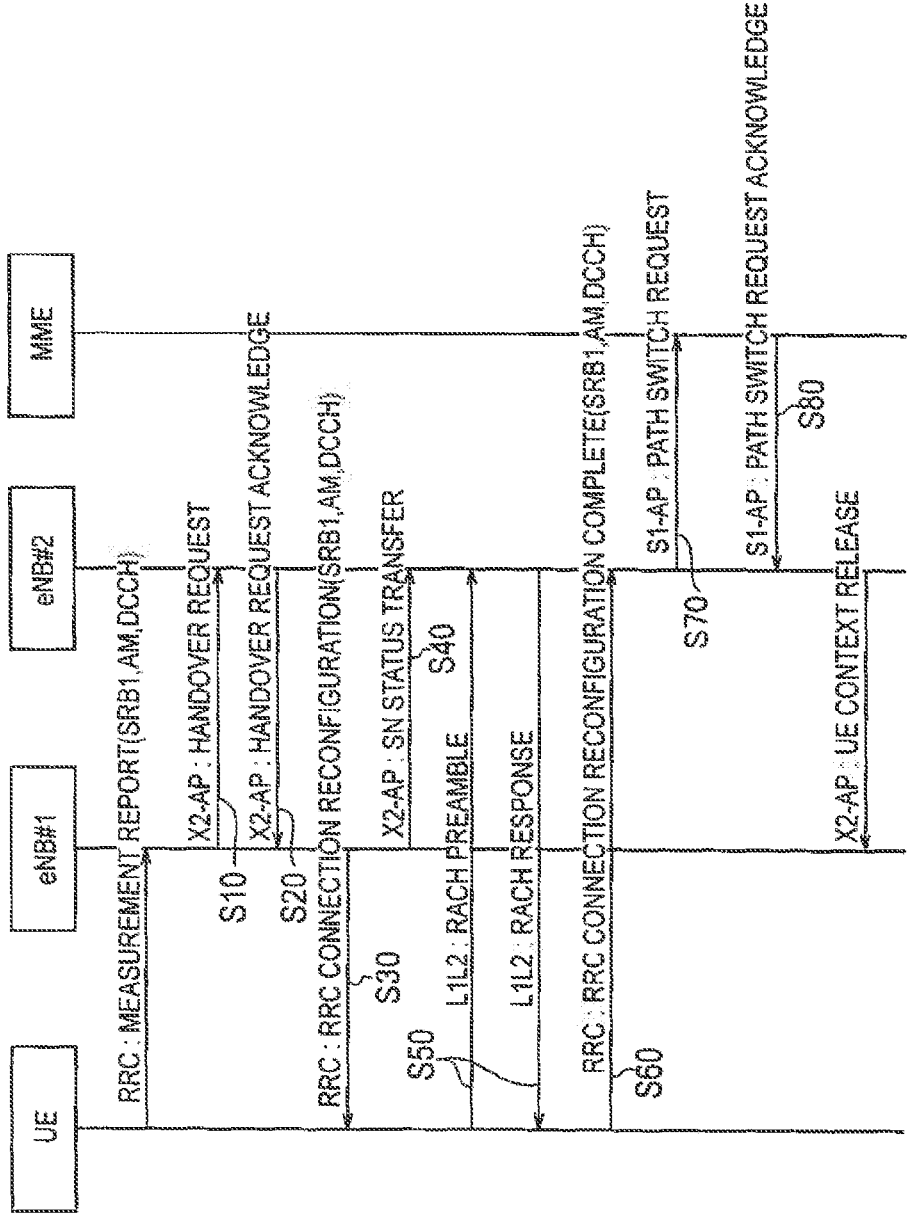
FIG. 1 is a diagram illustrating a communication sequence of a conventional inter base-station handover.
Figure 3:
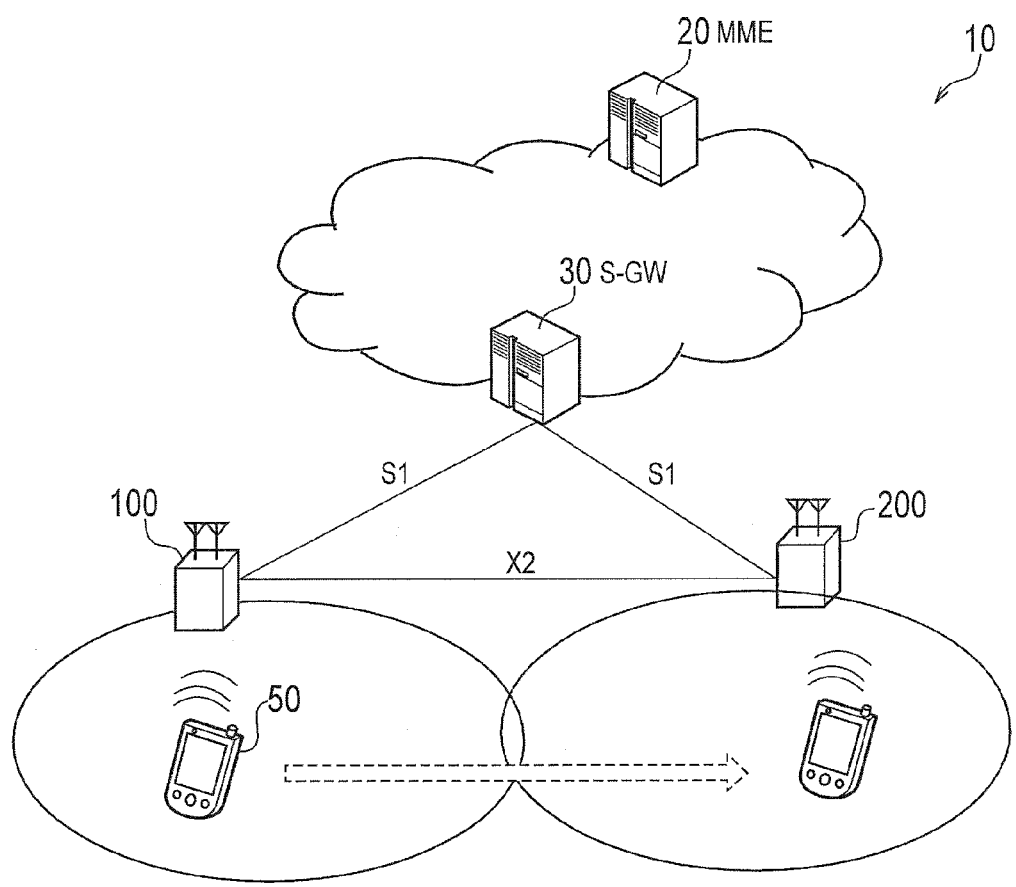
FIG. 3 is an overall schematic configuration diagram of a mobile communication system 10 according to an embodiment of the present invention.

FIG. 3 is an overall schematic configuration diagram of a mobile communication system 10 according to a present embodiment. As illustrated in FIG. 3, the mobile communication system 10 includes a Mobile Management Entity 20 (hereinafter, MME 20), a Serving Gateway 30 (hereinafter, S-GW 30), a UE 50, a radio base station 100 (hereinafter, eNB 100) and a radio base station 200 (hereinafter, eNB 200). The mobile communication system 10 is capable of performing radio communications in conformity to Long Term Evolution (LTE) specified in 3GPP, and the MME 20 and the S-GW 30 constitute part of a core network (Evolved Packet Core (EPC)).

The MME 20 manages the eNB 100 and the eNB 200, and performs mobility control for the UE 50, and control of bearers established between the UE 50 and the eNBs 100, 200. The S-GW 30 is a packet switch that receives and transmits packet data from and to the UE 50 via the eNBs 100, 200.

The UE 50 is capable of performing radio communications in conformity to LTE. The UE 50 sends a measurement result (MEASUREMENT REPORT) of a radio environment to a radio base station to which the UE 50 is attached, and on the basis of a request from the ratio base station, executes a handover to another radio base station.

The eNB 100 is connected to the MME 20 (higher-level station) via a trunk transmission path (first transmission path). The trunk transmission path (interface) is defined as "S1" in LTE. In the present embodiment, the eNB 100 constitutes a first radio base station.

The eNB 200 is connected to the MME 20 via a trunk transmission path (second transmission path), and is connected to the eNB 100 via an inter base-station transmission path. In the present embodiment, the eNB 200 constitutes a second radio base station. Note that the inter base-station transmission path (interface) is defined as "X2" in LTE.

The trunk transmission path between the MME 20 and the eNB 100 or the eNB 200 is hereinbelow referred to as a highway as needed. The inter base-station transmission path is configured by way of a relay device such as a router.

(2) Functional Block Configuration of Mobile Communication System

Figure 4:
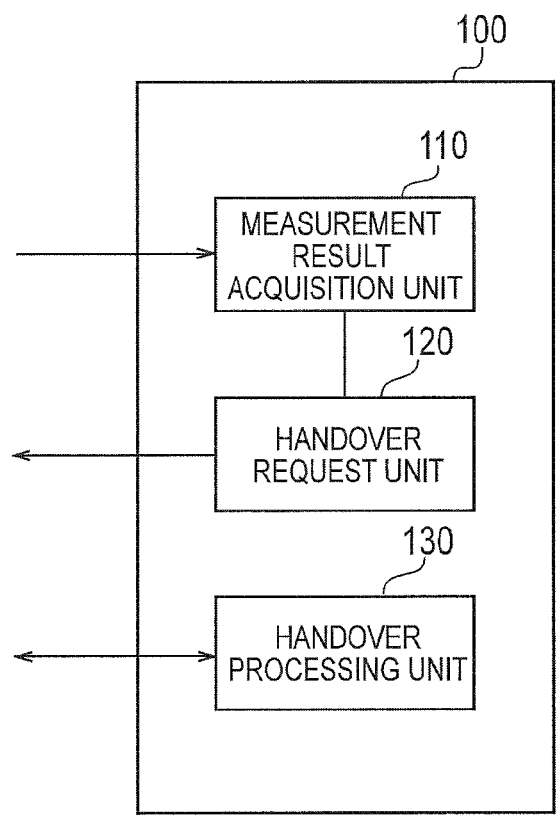
FIG. 4 is a functional block configuration diagram of an eNB 100 according to the embodiment of the present invention.
Figure 5:
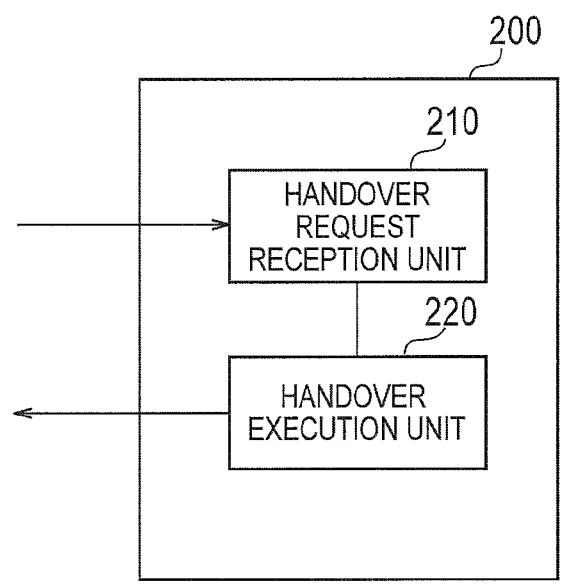
FIG. 5 is a functional block configuration diagram of an eNB 200 according to the embodiment of the present invention.

Next, a functional block configuration of the mobile communication system 10 is explained. Specifically, functional block configurations of the eNB 100 and the eNB 200 are explained. FIG. 4 is a functional block configuration diagram of the eNB 100, whereas FIG. 5 is a functional block configuration diagram of the eNB 200. It should be noted that FIGS. 4 and 5 illustrate only functional blocks involved in the present invention.

(2.1) eNB 100

As illustrated in FIG. 4, the eNB 100 includes a measurement result acquisition unit 110, a handover request unit 120 and a handover processing unit 130.

The measurement result acquisition unit 110 acquires MEASUREMENT REPORT which is a measurement result of a radio environment at a location of the UE 50 attached to the eNB 100. Specifically, the measurement result acquisition unit 110 directly receives MEASUREMENT REPORT contained in a radio signal transmitted from the UE 50.

The handover request unit 120 transmits a handover request that requests an inter base-station handover of the UE 50 from the eNB 100 to the eNB 200 via the inter base-station transmission path.

Specifically, the handover request unit 120 determines whether or not to cause the UE 50 to perform the handover from the eNB 100 to the eNB 200 on the basis of a content of MEASUREMENT REPORT acquired by the measurement result acquisition unit 110. If the handover request unit 120 determines to perform the handover, the handover request unit 120 sends X2-AP: HANDOVER REQUEST to the eNB 200.

In the case of performing an inter base-station handover of the UE 50 from the eNB 100 to the eNB 200 via the inter base-station transmission path, if the handover of the UE 50 from the eNB 100 to the eNB 200 is to be completed without switching the highway (S1) between the S-GW 30 and the eNB 100, the handover request unit 120 can form X2-AP: HANDOVER REQUEST by containing identification information (here, called NO HWY CHANGE) indicating that the handover will be completed without switching the highway.

On the basis of an acknowledgement received from the eNB 200 in reply to the handover request, namely, X2-AP: HANDOVER REQUEST ACKNOWLEDGE, the handover processing unit 130 performs processing for transferring control over the UE 50 from the eNB 100 to the eNB 200, and for executing the inter base-station handover of the UE 50 from the eNB 100 to the eNB 200. Specifically, the handover processing unit 130 sends RRC: RRC CONNECTION RECONFIGURATION to the UE 50. In addition, the handover processing unit 130 sends the eNB 200 X2-AP: SN STATUS TRANSFER that is information indicating transmission/reception statuses of data pieces transmitted and received by the eNB 100 to and from the UE 50.

(2.2) eNB 200

As illustrated in FIG. 5, the eNB 200 includes a handover request reception unit 210 and a handover execution unit 220.

The handover request reception unit 210 receives a handover request from the eNB 100. Specifically, the handover request reception unit 210 receives X2-AP: HANDOVER REQUEST received from the eNB 100 via the inter base-station transmission path.

If the handover request reception unit 210 receives a handover request, the handover execution unit 220 executes the inter base-station handover by using a communication path to the UE 50 via the highway between the MME 20 and the eNB 100 (first transmission path) and the inter base-station transmission path. Specifically, the handover execution unit 220 sends an acknowledgement (X2-AP: HANDOVER REQUEST ACKNOWLEDGE) in reply to the received handover request to the eNB 100. In addition, based on the reception of X2-AP: SN STATUS TRANSFER received from the eNB 100, i.e., the information indicating the transmission/reception statuses of data pieces transmitted and received by the eNB 100 to and from the UE 50, the handover execution unit 220 identifies, among the data pieces to be transferred from the eNB 100 to the UE 50, the position of each data piece to be transmitted and received by the eNB 200 and the UE 50. Moreover, the handover execution unit 220 and the UE 50 perform transmission and reception of RACH Preamble.

In the case where received X2-AP: HANDOVER REQUEST contains NO HWY CHANGE, the handover execution unit 220 completes the handover of the UE 50 from the eNB 100 to the eNB 200 without particularly performing any processing other than the foregoing one, in other words, while keeping active the communication path to the UE 50 via the highway between the MME 20 and the eNB 100 and the inter base-station transmission path, and sends the eNB 100 X2-AP: CONTEXT RELEASE (NO HWY CHANGE) which requests to release resources for the UE 50 except for configuration information needed to perform transfers. Specifically, the handover execution unit 220 completes the handover without switching from the highway between the MME 20 and the eNB 100 (first transmission path) to the highway between the MME 20 and the eNB 200 (second transmission path). In other words, the handover execution unit 220 completes the handover while the inter base-station transmission path between the eNB 100 and the eNB 200 (X2) is kept used as the communication path between the S-GW 30 and the UE 50.

More specifically, the handover execution unit 220 completes the handover without sending the MME 20 a switch request (S1-AP: PATH SWITCH REQUEST) which requests to switch from the highway between the MME 20 and the eNB 100 to the highway between the MME 20 and the eNB 200.

Note that, if the predetermined condition as described above, i.e., the case where received X2-AP: HANDOVER REQUEST contains NO HWY CHANGE in the present embodiment, is satisfied, the handover execution unit 220 executes an inter base-station handover and completes the handover of the UE 50 from the eNB 100 to the eNB 200. Needless to say, the predetermined condition is not limited to the case where X2-AP: HANDOVER REQUEST contains NO HWY CHANGE. On the basis of a content of Neighbor Relation Table (NRT), for example, which contains information on neighboring base stations and is held in the eNB 200, the eNB 100 may judge that the predetermined condition is satisfied if the content of the NRT indicates that the handover may be completed with the inter base-station transmission path between the eNB 100 and the eNB 200 (X2) kept used as the communication path between the S-GW 30 and the UE 50, and then the handover execution unit 220 may complete the handover without sending the MME 20 a switch request (S1-AP: PATH SWITCH REQUEST) which requests to switch from the highway between the MME 20 and the eNB 100 to the highway between the MME 20 and the eNB 200.

(3) Operation of Mobile Communication System 10

Next, an operation of the mobile communication system 10 is explained. Specifically, description is provided for a communication sequence for a case where the UE 50 performs a handover from the eNB 100 to the eNB 200 without switching from the highway between the MME 20 and the eNB 100 to the highway between the MME 20 and the eNB 200.

Figure 6:
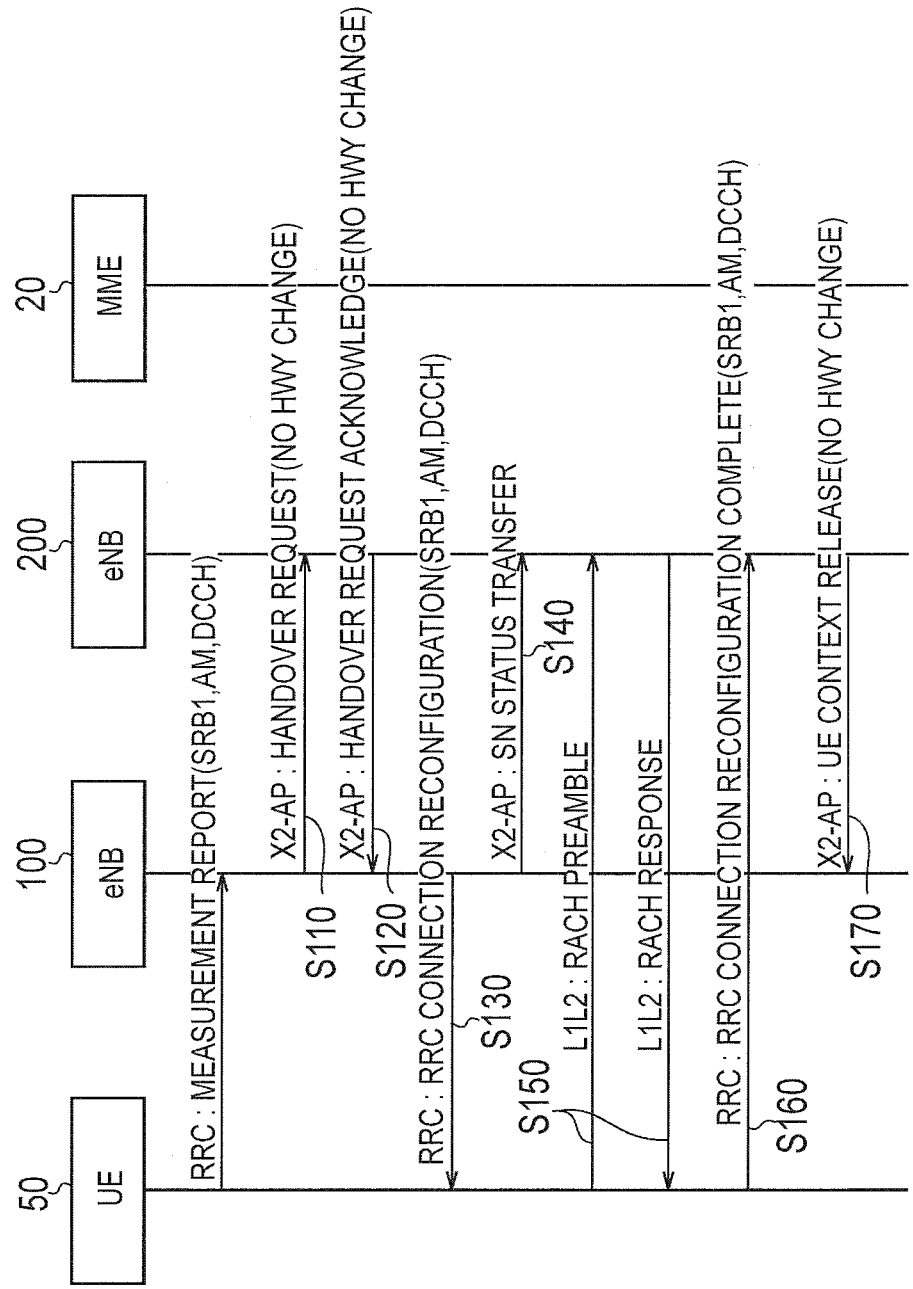
FIG. 6 is a diagram illustrating a communication sequence in a case where a UE 50 performs a handover from the eNB 100 to the eNB 200 according to the embodiment of the present invention.

FIG. 6 presents the communication sequence for the case where the UE 50 performs the handover from the eNB 100 to the eNB200 (see a dashed-line arrow in FIG. 3) without switching from the highway between the MME 20 and the eNB 100. As presented in FIG. 6, the eNB 100 sends X2-AP: HANDOVER REQUEST to the eNB 200 on the basis of the measurement result of the radio environment (RRC: MEASUREMENT REPORT) received from the UE 50 (S110). Here, it is assumed that the eNB 100 selects execution of an inter base-station handover of the UE 50 to the eNB 200 without switching from the highway between the MME 20 and the eNB 100 to the highway between the MME 20 and the eNB 200. In this case, the eNB 100 sends the eNB 200 X2-AP: HANDOVER REQUEST containing NO HWY CHANGE indicating that a handover shall be completed without switching the highway, as described above.

The eNB 200 sends the eNB 100 X2-AP: HANDOVER REQUEST ACKNOWLEDGE (NO HWY CHANGE) which is an acknowledgement in reply to X2-AP: HANDOVER REQUEST (S120). This acknowledgement triggers start of a handover not involving the switching of the highway.

The eNB 100 having received X2-AP: HANDOVER REQUEST ACKNOWLEDGE (NO HWY CHANGE) sends RRC: RRC CONNECTION RECONFIGURATION to the UE 50 (S130). In addition, the eNB 100 sends the eNB 200 X2-AP: SN STATUS TRANSFER which is the information indicating the transmission/reception statuses of data pieces transmitted and received by the eNB 100 to and from the UE 50 (S140). Moreover, the eNB 200 and the UE 50 perform transmission and reception of RACH Preamble (S150).

The UE 50 sends RRC: RRC CONNECTION RECONFIGURATION COMPLETE to the eNB 200 (S160) in response to RRC: RRC CONNECTION RECONFIGURATION received from the eNB 100 in step S130.

When receiving RRC: RRC CONNECTION RECONFIGURATION COMPLETE from the UE 50 The eNB 200 completes all the processing involved in the handover of the UE 50 from the eNB 100 to the eNB 200, and then sends the eNB 100 X2-AP: CONTEXT RELEASE (NO HWY CHANGE) which requests to release resources set for the UE 50 before the start of the handover, except for the configuration information needed to perform transfers (S170). Meanwhile, the eNB 200 does not send the MME 20 a switch request (S1-AP: PATH SWITCH REQUEST) which requests to switch from the highway between the MME 20 and the eNB 100 to the highway between the MME 20 and the eNB 200. In other words, neither the eNB 100 nor the eNB 200 sends any signal related to the handover to the MME 20.

Figure 7:
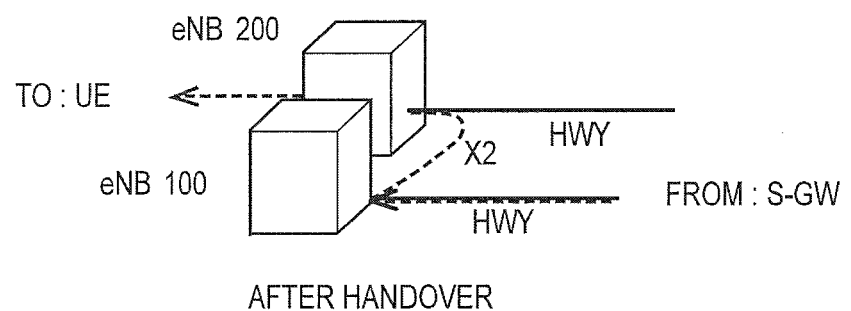
FIG. 7 is a diagram illustrating a route (dashed line) of a communication path from an S-GW 30 to the UE 50 after the processing in step S170 in FIG. 6 is completed.

Here, FIG. 7 illustrates a route of the communication path (dashed line) from the S-GW 30 to the UE 50 after completion of the processing in step S170. As illustrated in FIG. 7, even after the completion of the handover of the UE 50 to the eNB 200, the highway between the MME 20 and the eNB 100 remains unchanged and data addressed to the US 50 is transferred from eNB 200 to the UE 50 via the inter base-station transmission path (X2) between the eNB 100 and the eNB 200.

In the foregoing operation example, the case where the cell formed by the eNB 100 and the cell formed by the eNB 200 are barely overlaid on each other as illustrated in FIG. 3 has been presented as an example. However, using different frequency bands, the cell formed by the eNB 100 and the cell formed by the eNB 200 may be geographically overlaid on each other. No matter how the cells are configured, it is possible to execute a handover of the UE 50 without sending the MME 20 a switch request (S1-AP: PATH SWITCH REQUEST) which requests to switch from the highway between the MME 20 and the eNB 100 to the highway between the MME 20 and the eNB 200.

Moreover, the inter base-station transmission path is configured by way of a relay device such as a router as described above. In addition to such an inter base-station transmission path, a data transfer transmission path between the eNB 100 and the eNB 200 may be provided so as to directly connect the eNB 100 and the eNB 200 without involving a relay device such as a router. Then, the data transfer transmission path may be used in place of the inter base-station transmission. Such a data transfer transmission path is particularly suitable to a case where the eNB 100 and the eNB 200 are installed at locations close to each other, such as locations within the same building.

(4) Effects

The mobile communication system 10 enables the inter base-station handover using the inter base-station transmission path (X2) to be executed and the handover to be completed without sending the MME 20 a switch request (S1-AP: PATH SWITCH REQUEST) which requests to switch from the highway between the MME 20 and the eNB 100 to the highway between the MME 20 and the eNB 200.

In other words, any signals related to the handover are not sent to the MME 20 from the eNB 100 or the eNB 200, as mentioned above.

Thus, if an inter base-station handover is possible, no signals are transmitted to the core network. This leads to a reduction in the processing load on the MME 20 and the like constituting the core network.

Moreover, in the present embodiment, if X2-AP: HANDOVER REQUEST contains NO HWY CHANGE, a handover of the UE 50 from the eNB 100 to the eNB 200 is completed without switching of the highway. Thus, an appropriate selection of how a handover should be performed can be made with a simple operation of containing or not containing NO HWY CHANGE in X2-AP: HANDOVER REQUEST to be transmitted by the eNB 100.

(5) Other Embodiments

As described above, the details of the present invention have been disclosed by using the embodiment of the present invention. However, it should not be understood that the description and drawings which constitute part of this disclosure limit the present invention. From this disclosure, various alternative embodiments will be easily found by those skilled in the art.

For example, in the foregoing embodiment, the eNB 100 and the eNB 200 are managed by the single MME. However, a configuration named S1-Flex may be employed where the eNB 100 and the eNB 200 are each managed by multiple MMEs.

In addition, as described above, instead of the identification information (NO HWY CHANGE) contained in X2-AP: HANDOVER REQUEST, NRT may be used to determine whether or not to complete the handover without switching from the highway between the MME 20 and the eNB 100 (first transmission path) to the highway between the MME 20 and the eNB 200 (second transmission path).

Moreover, the present invention may be expressed as follows. A first feature of the present invention is a mobile communication system 10 including an eNB 100 (first radio base station) connected to an MME 20 (higher-level station) via a highway (first transmission path), and an eNB 200 (second radio base station) connected to the higher-level station via a highway (second transmission path) and connected to the first radio base station via an inter base-station transmission path. The first radio base station includes a handover request unit 120 configured to transmit X2-AP: HANDOVER REQUEST (handover request) which requests an inter base-station handover of a UE 50 (mobile station) from the first radio base station to the second radio base station via the inter base-station transmission path. The second radio base station includes: a handover request reception unit 210 configured to receive the handover request from the first radio base station; and a handover execution unit 220 configured to, when the handover request reception unit receives the handover request, perform the inter base-station handover by using a communication path to the mobile station via the first transmission path and the inter base-station transmission path, and complete the handover of the mobile station from the first radio base station to the second radio base station while keeping the communication path active.

In the first feature of the present invention, the handover execution unit may complete the handover of the mobile station from the first radio base station to the second radio base station without switching from the first transmission path to the second transmission path.

In the first feature of the present invention, the handover execution unit may complete the handover of the mobile station from the first radio base station to the second radio base station without sending the higher-level station S1-AP: PATH SWITCH REQUEST (switch request) which requests to switch from the first transmission path to the second transmission path.

In the first feature of the present invention, if predetermined condition (for example, a case where X2-AP: HANDOVER REQUEST contains NO HWY CHANGE) is satisfied, the handover execution unit may execute the inter base-station handover, and complete the handover of the mobile station from the first radio base station to the second radio base station.

A second feature of the present invention is an eNB 200 (radio base station) connected to a higher-level station via a trunk transmission path and connected to a different radio base station via an inter base-station transmission path, the radio base station including: a handover request reception unit configured to receive a handover request from the different radio base station; and a handover execution unit configured to, when the handover request reception unit receives the handover request, execute an inter base-station handover by using a communication path to a mobile station via the trunk transmission path between the higher-level station and the different radio base station and the inter base-station transmission path, and complete the handover of the mobile station from the different radio base station to the radio base station while keeping the communication path active.

A third feature of the present invention is a communication method using a first radio base station connected to a higher-level station via a first transmission path and a second radio base station connected to the higher-level station via a second transmission path and connected to the first radio base station via an inter base-station transmission path, the method including the steps of: causing the first radio base station to send a handover request which requests an inter base-station handover of a mobile station from the first radio base station to the second radio base station via the inter base-station transmission path; causing the second radio base station to receive the handover request from the first radio base station; and causing the second radio base station to execute the inter base-station handover by using a communication path to the mobile station via the first transmission path and the inter base-station transmission path, and to complete the handover of the mobile station from the first radio base station to the second radio base station while keeping the communication path active.

As described above, the present invention naturally includes various embodiments and the like which are not described herein. Accordingly, the technical scope of the present invention should be determined only by the matters to define the invention in the scope of claims regarded as appropriate based on the foregoing description.

Note that the entire content of Japanese Patent Application No. 2012-126138 (filed on Jun. 1, 2012) is incorporated by reference in the present specification.

INDUSTRIAL APPLICABILITY

According to the features of the present invention, what can be provided are a radio communication system, a radio base station and a communication method which enable an inter base-station handover while reducing a processing load on a core network.

EXPLANATION OF THE REFERENCE NUMERALS 10 mobile communication system
20 MME
30 S-GW
50 UE
100, 200 eNB
110 measurement result acquisition unit
120 handover request unit
130 handover processing unit
210 handover request reception unit
220 handover execution unit

The invention claimed is:

1. A radio communication system comprising:
a first radio base station connected to a higher-level station via a first transmission path; and
a second radio base station connected to the higher-level station via a second transmission path and connected to the first radio base station via an inter base-station transmission path, wherein the first radio base station includes
a handover request unit configured to transmit a handover request which requests an inter base-station handover of a mobile station from the first radio base station to the second radio base station via the inter base-station transmission path, and
the second radio base station includes:
a handover request reception unit configured to receive the handover request from the first radio base station; and
a handover execution unit configured to, when the handover request reception unit receives the handover request, complete the handover of the mobile station from the first radio base station to the second radio base station by using a communication path to the mobile station via the first transmission path and the inter base-station transmission path without switching from the first transmission path to the second transmission path.

2. The radio communication system according to claim 1, wherein the handover execution unit completes the handover of the mobile station from the first radio base station to the second radio base station without sending the higher-level station a switch request which requests to switch from the first transmission path to the second transmission path switch request.

3. The radio communication system according to claim 1, wherein when a predetermined condition is satisfied, the handover execution unit executes the inter base-station handover, and completes the handover of the mobile station from the first radio base station to the second radio base station.

4. A radio base station connected to a higher-level station via a trunk transmission path and connected to a different radio base station via an inter base-station transmission path, the radio base station comprising:
a handover request reception unit configured to receive a handover request from the different radio base station; and
a handover execution unit configured to, when the handover request reception unit receives the handover request, complete a handover of a mobile station from the different radio base station to the radio base station by using a communication path to the mobile station via a trunk transmission path between the higher-level station and the different radio base station and the inter base-station transmission path without switching from the trunk transmission path to the inter base-station transmission path.

5. A communication method using a first radio base station connected to a higher-level station via a first transmission path, and a second radio base station connected to the higher-level station via a second transmission path and connected to the first radio base station via an inter base-station transmission path, the method comprising the steps of:

causing the first radio base station to send a handover request which requests an inter base-station handover of a mobile station from the first radio base station to the second radio base station via the inter base-station transmission path;

causing the second radio base station to receive the handover request from the first radio base station; and causing the second radio base station to complete the handover of the mobile station from the first radio base station to the second radio base station by using a communication path to the mobile station via the first transmission path and the inter base-station transmission path without switching from the first transmission path to the second transmission path.

\* \* \* \* \*